Oct. 9, 1945.    C. A. BAILEY    2,386,181
MEASURING DEVICE
Filed Oct. 7, 1943    2 Sheets-Sheet 1

Inventor
CARROL A. BAILEY

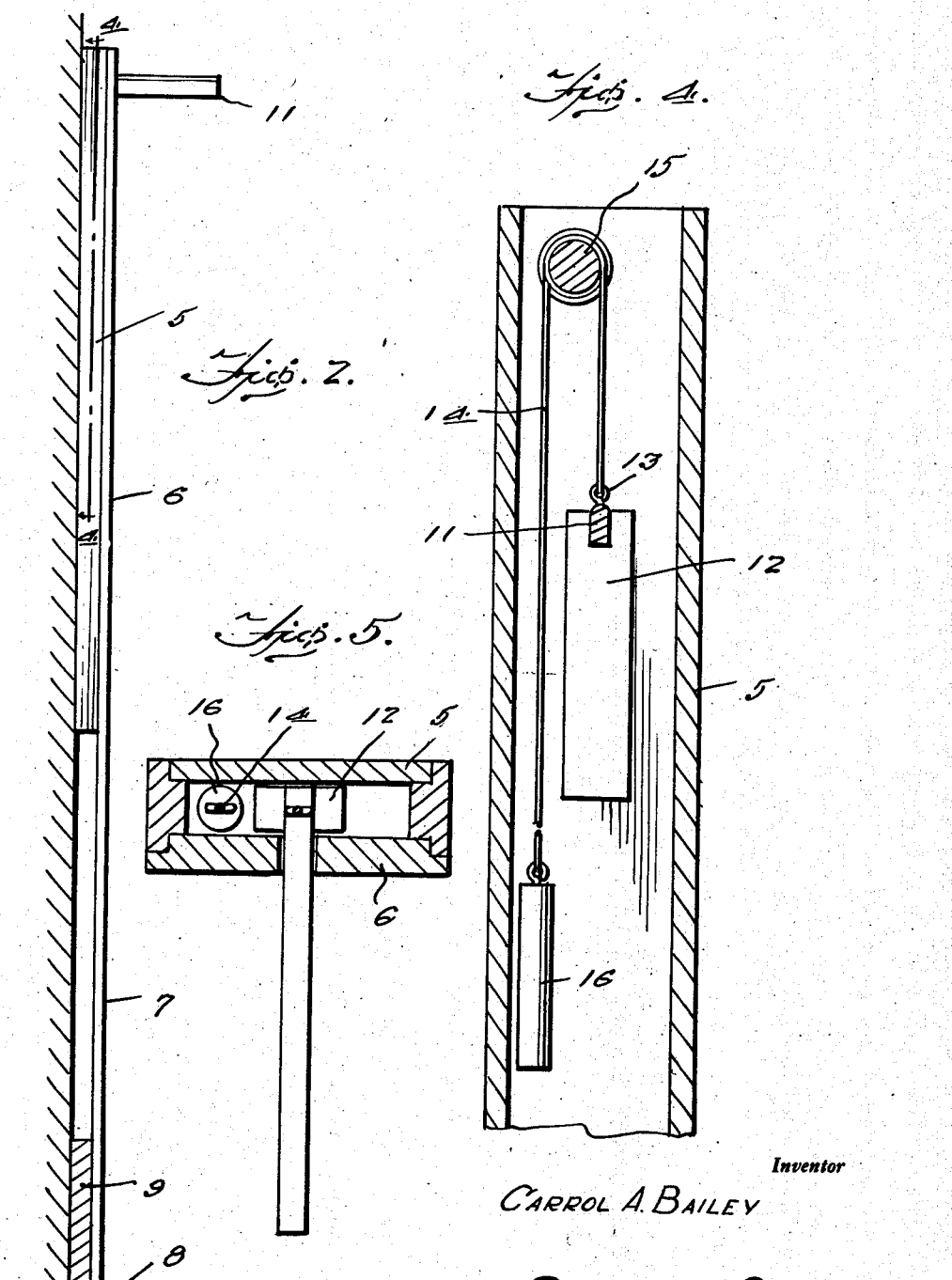

Patented Oct. 9, 1945

2,386,181

UNITED STATES PATENT OFFICE 2,386,181

MEASURING DEVICE

Carrol A. Bailey, Woodland, Calif.

Application October 7, 1943, Serial No. 505,381

1 Claim. (Cl. 33—169)

This invention relates to new and useful improvements in measuring devices especially adapted for measuring the height of human beings.

The principal object of the present invention is to provide a simple measuring device which will serve to measure individuals in a quick and accurate manner.

Another important object of the invention is to provide a simple measuring device of the character stated which can be installed in schools and various other institutions and even in homes at a very low cost.

Other objects and advantages of the invention will become apparent to the reader of the following description.

In the drawings:

Figure 2 is a fragmentary vertical sectional view through a wall showing the device in side elevation.

Figure 4 is a fragmentary vertical sectional view through the device taken substantially on line 4—4 of Figure 2.

Figure 5 is an enlarged detailed sectional view taken on line 5—5 of Figure 1.

Figure 1:
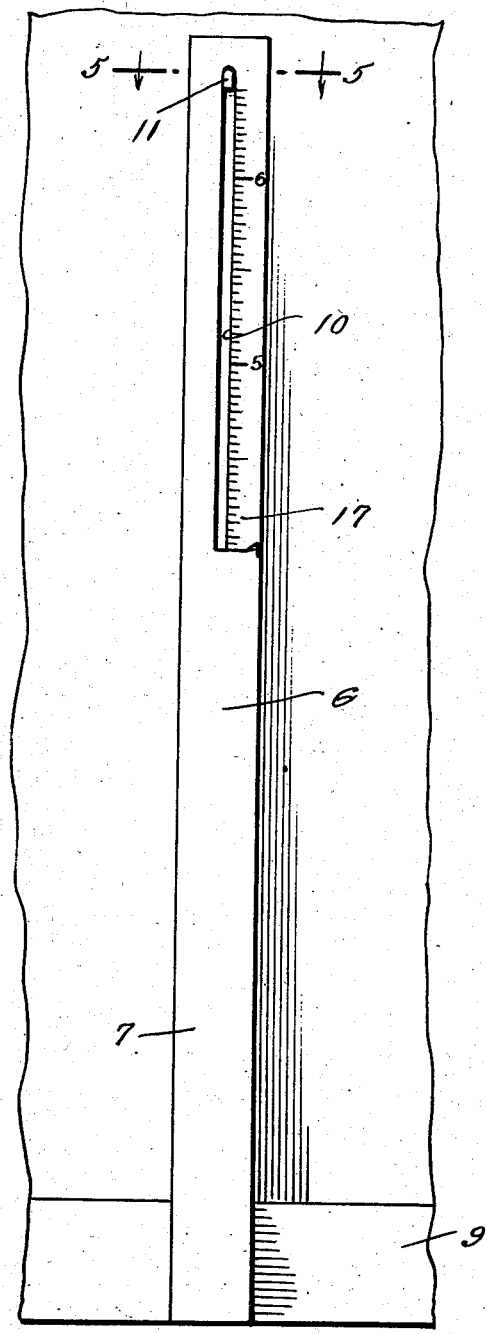
Figure 1 is a fragmentary elevational view showing the measuring device applied to a wall.

Referring to the drawings, wherein like numerals designate like parts, it can be seen that the measuring device consists of a shallow, vertically elongated box 5, the front wall 6 of which extends downwardly below the box proper to define a supporting leg 7 which may rest upon a floor 8 just outside of the usual baseboard 9.

The upper portion of the front wall 6 has a vertically extending slot 10 therein through which projects a horizontal member 11 projecting from a vertically elongated weight 12 which is vertically slidable within the shallow box 5. Where the horizontal member 11 connects to the weight 12, an eye 13 is provided and to this eye is attached one end of a cable or cord 14, which in turn passes over a pulley 15 and extends downwardly to connect to a counterweight 16.

Graduations 17 are provided along one side of the slot 10.

Figure 3:
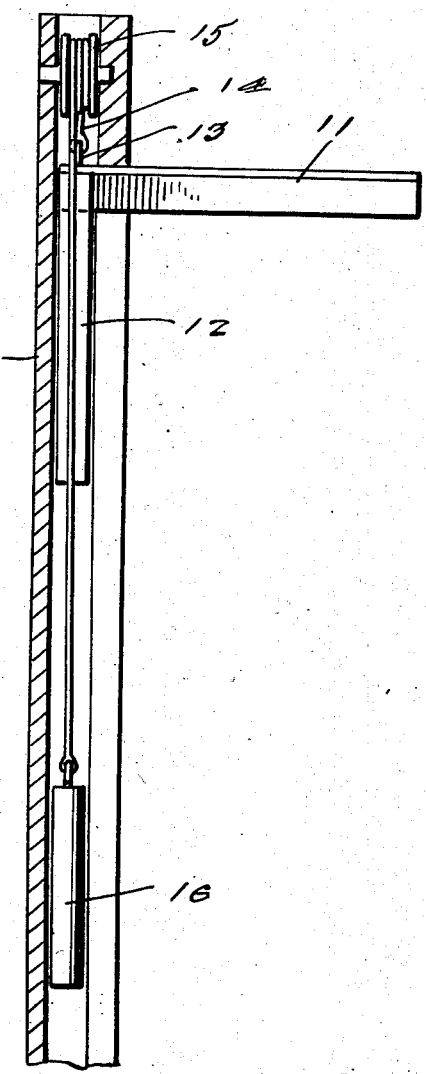
Figure 3 is a fragmentary vertical sectional view through the device.

It is desirable that the weight 16 slightly overbalance the weight 12 to the end that normally the horizontal member 11 will remain in the elevated position shown in Fig. 3. However, a very slight downward pressure will bring the horizontal member 11 downwardly to the top of the head of a subject to be measured with but the slightest expenditure of effort.

Thus, scores of students in school and other individuals may have their height measured quickly and accurately with but a very slight expenditure of effort on the part of the attendant.

While the foregoing specification sets forth the invention in specific terms, it is to be understood that numerous changes in the shape, size and materials may be resorted to without departing from the spirit and scope of the invention as claimed hereinafter.

Having described the invention what is claimed as new is:

A height measuring device of the character described comprising a shallow vertically elongated box adapted to be fixed to the wall of a room in an elevated position and having relatively broad front and rear flat walls and narrower flat side walls, the thickness of the box from front to rear being substantially the same as that of a baseboard provided around the wall, said front wall having a vertically elongated slot therein and graduations along one side of the slot, a leg extension depending from the front wall into contact with the floor and against the baseboard, a pulley journaled in the upper portion of the box on an axis extending parallel with the sides of the box, a flexible member trained over said pulley, a vertically elongated member attached to one end of said flexible member and movable vertically in the box, a horizontal head contacting member fixed to said vertically elongated member and projecting forwardly through and slidable in said slot, and a counter weight attached to the other end of said flexible member and movable vertically in the box at one side of said vertically elongated member, said vertically elongated member and said counter weight substantially contacting the front and rear walls of the box.

CARROL A. BAILEY.